(12) United States Patent
Spray

(10) Patent No.: US 12,246,779 B2
(45) Date of Patent: Mar. 11, 2025

(54) MANUAL DISCONNECT SYSTEM FOR POWERED RETRACTABLE COVER

(71) Applicant: RETRAX HOLDINGS, LLC, Ann Arbor, MI (US)

(72) Inventor: Lucas R. Spray, Grand Forks, ND (US)

(73) Assignee: RETRAX HOLDINGS, LLC, Ann Arbor, MI (US)

( * ) Notice: Subject to any disclaimer, the term of this patent is extended or adjusted under 35 U.S.C. 154(b) by 298 days.

(21) Appl. No.: 17/953,952

(22) Filed: Sep. 27, 2022

(65) Prior Publication Data

US 2023/0159112 A1 May 25, 2023

Related U.S. Application Data

(60) Provisional application No. 63/271,925, filed on Oct. 26, 2021.

(51) Int. Cl.
| | | |
|---|---|---|
| *B62D 33/04* | (2006.01) | |
| *B60J 7/06* | (2006.01) | |
| *B60J 7/14* | (2006.01) | |
| *E05F 15/643* | (2015.01) | |
| *E05F 15/657* | (2015.01) | |
| *E06B 9/15* | (2006.01) | |
| *E06B 9/74* | (2006.01) | |
| *E06B 9/58* | (2006.01) | |

(52) U.S. Cl.
CPC .............. *B62D 33/04* (2013.01); *B60J 7/068* (2013.01); *B60J 7/141* (2013.01); *E05F 15/643* (2015.01); *E05F 15/657* (2015.01); *E06B 9/74* (2013.01); *E05Y 2201/214* (2013.01); *E05Y 2201/434* (2013.01); *E05Y 2201/654* (2013.01); *E05Y 2201/684* (2013.01); *E05Y 2400/3013* (2024.05); *E05Y 2900/53* (2013.01); *E06B 2009/1583* (2013.01); *E06B 2009/585* (2013.01)

(58) Field of Classification Search
CPC .................. E05F 15/657; E05F 15/692; E06B 2009/1583; E06B 2009/585; E06B 9/74; B60J 7/141; B60J 7/085; B60J 7/068
See application file for complete search history.

(56) References Cited

U.S. PATENT DOCUMENTS

| | | | | |
|---|---|---|---|---|
| 5,040,843 | A * | 8/1991 | Russell | .................. E06B 9/581 |
| | | | | 296/100.09 |
| 11,142,050 | B2 | 10/2021 | Pompili et al. | |
| 2019/0210437 | A1* | 7/2019 | Carter | ....................... B60P 7/04 |
| 2021/0107343 | A1* | 4/2021 | Rørvig | .................. B60J 7/0573 |
| 2021/0285266 | A1 | 9/2021 | Carter et al. | |

OTHER PUBLICATIONS

Co-pending U.S. Appl. No. 17/496,290, filed Oct. 7, 2021.
Co-pending U.S. Appl. No. 16/953,839, filed Nov. 20, 2020 (Published as US2021/0285266).
First Office Action from Canadian Patent Application No. 3,177,837 dated Mar. 22, 2024.

* cited by examiner

*Primary Examiner* — Daniel J Colilla

(57) ABSTRACT

A tonneau cover comprising: (a) a slat; (b) a drive system adapted to move the slat; and (c) a disconnect connected to the slat and in communication with the drive system, wherein the disconnect is adapted to release from communication with the drive system so that the slat manually moves independently from the drive system.

17 Claims, 6 Drawing Sheets

MANUAL DISCONNECT SYSTEM FOR POWERED RETRACTABLE COVER

CROSS-REFERENCE TO RELATED APPLICATIONS

This application claims priority to U.S. Provisional Patent Application No. 63/271,925, filed on Oct. 26, 2021, all of which is hereby incorporated by reference herein in its entirety for all purposes.

FIELD

The present teachings generally relate to a tonneau cover, and more specifically, to a retractable tonneau cover having a manual disconnect system.

BACKGROUND

Tonneau systems are typically used to cover and protect a cargo bed or unoccupied portion of a vehicle from environmental degradation. Typical tonneau systems include a plurality of structural members that are attached directly to the vehicle to form a frame. A cover is then secured to the frame, preventing moisture, debris, or unwanted objects from entering the cargo bed or unoccupied portion and damaging cargo or the vehicle itself. The tonneau system may include a rigid frame design, such that when fully assembled and attached to the vehicle, the frame creates a unitary structure. The tonneau system may also include one or more rails that movably secure the cover so that the cover may be retracted by rolling or folding the cover onto itself to uncover only a portion of the cargo bed or unoccupied portion.

It may often be desirable to easily open and close a cover to access the cargo bed or unoccupied portion of a vehicle. In an effort to aid with opening and closing of the tonneau cover, many tonneau systems include a motor that opens and closes the cover automatically based upon user input (e.g., a button, a fob, etc.). However, while automatic tonneau systems increase ease of opening and closing the tonneau cover, a user may be unable to open and/or close the cover when the motor is not operational. For example, a user may be unable to open a closed cover if the tonneau system is without power to operate the motor, or if the motor has failed or otherwise been rendered defective. Thus, a user may be required to service the vehicle and repair the tonneau system before the tonneau cover may be opened.

Examples of tonneau systems may be found in U.S. patent application Ser. No. 17/496,290, filed on Oct. 7, 2021, all of which is incorporated herein in their entirety for all purposes. It would be attractive to have a tonneau system with motorized operation that includes manual accessibility. What is needed is a motorized tonneau cover with the ability to manually open and close the cover. It would also be attractive to have a motorized tonneau system with a mechanical release. What is needed is a motorized tonneau system having a mechanical disconnect system in communication with the drive system of the tonneau cover. Additionally, it would be attractive to have the aforementioned disconnect system be easily operated by a user of the tonneau system. Thus, what is needed is a disconnect system positioned near a tail of the vehicle bed for easy access by the user.

SUMMARY

The present teachings meet one or more of the present needs by providing a tonneau cover comprising: (a) a slat; (b) a drive system adapted to move the slat; and (c) a disconnect connected to the slat and in communication with the drive system, wherein the disconnect is adapted to release from communication with the drive system so that the slat manually moves independently from the drive system.

The present teachings meet one or more of the present needs by providing a tonneau cover, wherein: the disconnect may be positioned within a channel of the slat and the disconnect may be adapted to slide along the channel of the slat; the disconnect may be supported by opposing flanges of the channel; the slat may extend between a first side rail and a second side rail, and the drive system may be at least partially positioned within an opening of the first side rail; the drive system may include a cable extending through the opening of the first side rail, and the disconnect may be in communication with the cable; an extension of the disconnect may extend inwardly into the opening of the first side rail to receive an extension of the cable; the drive system may be driven by one or more motors to move the slat along the first side rail and the second side rail; the extension of the disconnect may extend through an end cap secured to a terminal end of the slat; the tonneau cover may also include a plurality of slats, and the disconnect may be connected to a tail slat positioned closest to a tailgate of a cargo box of a vehicle when the tonneau cover is secured to the cargo box; the disconnect may engage a first pair of notches along the opposing flanges of the channel when in communication with the drive system; the disconnect may engage a second pair of notches along the opposing flanges of the channel when released from communication with the drive system; at least a portion of the disconnect may be biased against the opposing flanges of the channel to engage the first pair of notches; or a combination thereof.

Additionally, the present teachings meet one or more of the present needs by providing a tonneau cover, comprising: (a) a slat extending between a first side rail and a second side rail; (b) a drive system adapted to move the slat, wherein the drive system is driven by one or more motors; and (c) a disconnect secured within a channel of the slat, comprising: (i) a block having a cavity therein, the block being supported by flanges of the channel; (ii) an extension extending away from the block inwardly towards an opening of the first side rail; (iii) a lever pivotally engaged to the block and at least partially positioned within the cavity of the block; and (iv) a biasing member in communication with the block and the lever to bias the level away from the block; wherein the extension of the disconnect is connected to the drive system so that the drive system drives the slat.

The drive system may include a cable extending through a channel positioned within the opening of the first side rail, and the extension of the disconnect engages the cable. The disconnect may be adapted to slide along the channel of the slat and disconnect from the drive system. Additionally, the lever may include a tab having a projection, and the projection of the tab may engage a slot along the channel of the slat to maintain a position of the disconnect within the channel. Moreover, the lever may be pivoted upward toward the block so that the projection is positioned within an opening of the block, thereby disconnecting the projection from the slot along the channel and allowing the block to move along the channel. Furthermore, a pin may be secured within the cavity of the block and extend through the biasing member and barrels of the lever to pivotally engage the lever and the block. The pin may also be secured within opposing apertures of the block. Similarly, the extension of the disconnect includes a receiving portion the receives an extension of the cable when in an engaged position.

The present teachings also provide: a tonneau system with motorized operation that includes manual accessibility; a motorized tonneau cover with the ability to manually open and close the cover; a motorized tonneau system with a mechanical release; a motorized tonneau system having a mechanical disconnect system in communication with the drive system of the tonneau cover; a disconnect system easily operated by a user of the tonneau system; a disconnect system positioned near a tail of the vehicle bed for easy access by the user; or a combination thereof.

DETAILED DESCRIPTION

Figure 1:
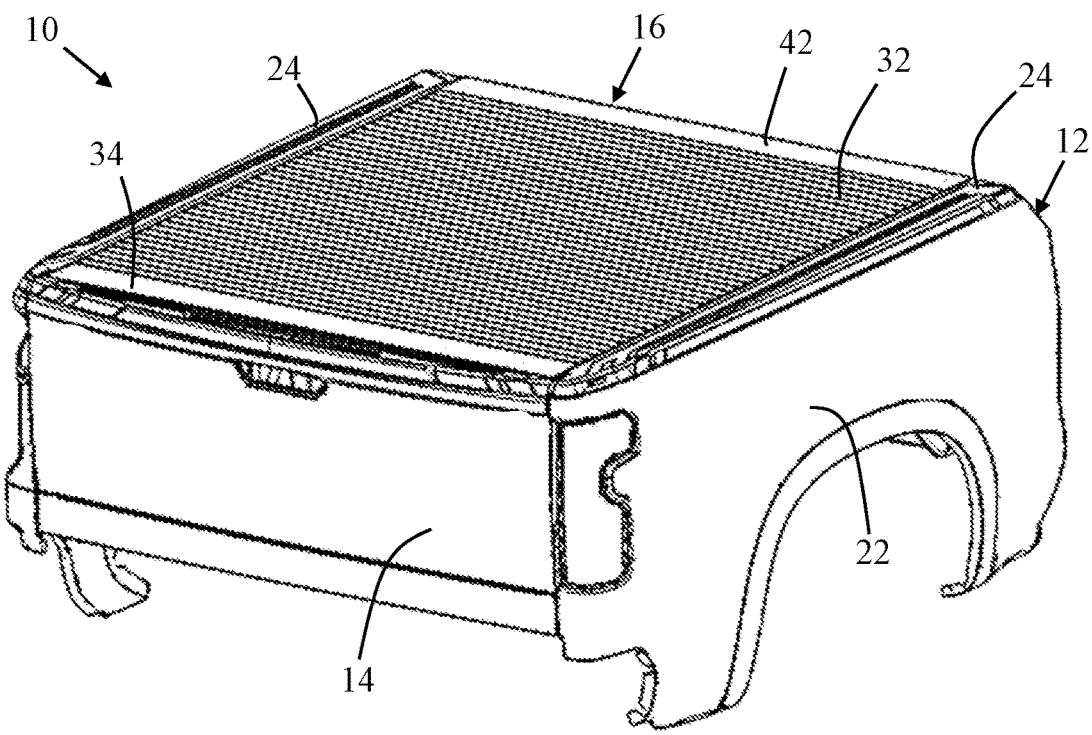
FIG. 1 is a perspective view of a cargo box of a vehicle with a tonneau cover in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference in their entirety for all purposes. Other combinations are also possible as will be gleaned from the following claims, which are also hereby incorporated by reference in their entirety into this written description.

The teachings herein generally relate to a vehicle and a system for a vehicle. The vehicle may be any type of automobile, such as a car, truck, SUV, commercial vehicle, or a combination thereof. The vehicle may include a system integrating one or more accessories into the vehicle. The accessories may be assembly as part of the vehicle by the Original Equipment Manufacturer (OEM), may be provided as a secondary aftermarket accessory, or a combination thereof. The accessories may include one or more lights, one or more latches, one or more mechanical disconnects, one or more actuators, one or more mirrors, one or more doors, one or more interior accessories, one or more exterior accessories, or a combination thereof.

The accessories may be located near or along a cargo box of the vehicle. The cargo box may be defined as a storage portion of the vehicle adjacent to a cabin of the vehicle. The cargo box may be partially enclosed, fully enclosed, or both. The cargo box may include one or more openings, one or more doors, or a combination thereof. The cargo box may be formed from one or more side rails, one or more fenders, one or more panels, or a combination thereof. The side rails may extend parallel to each other and may be further enclosed by the fenders, panels, or both.

The cargo box may include a tailgate. The tailgate may function to at least partially enclose the cargo box. The tailgate may function as an access point into the cargo box. The tailgate may be considered an accessory of the cargo box. The tailgate may be moveable between an open position and a closed position. The open position may be when the tailgate is substantially parallel to the ground and provides an open access point into the cargo box. The closed position may be when the tailgate is substantially perpendicular to the ground and substantially encloses at least a portion of the cargo box. The tailgate may also move and/or be secured in one or more positioned between the open position and the closed position. The tailgate may be manually operated by a user or may be actuated by one or more powered actuators. The tailgate may operate with physical user interaction or may be actuated remotely.

The tailgate may be used in conjunction with a tonneau cover. The tonneau cover may function to protect against dirt, debris, water, other contaminants, or a combination thereof from entering an inside of a cargo box. The tonneau cover may be a cover that functions to conceal the inside of the cargo box and/or any contents inside the cargo box. The tonneau cover may be placed over the cargo bed of a vehicle, such as a pickup truck. As such, the tonneau cover may also be considered an accessory of the vehicle.

The tonneau cover may comprise multiple enclosure panels or a single panel. One or more of the panels may be slats. One or more of the slats may be moved or repositioned relative to one another to move the tonneau cover between an open position and a closed position. One or more of the slats may be substantially rigid. One or more of the slats may be substantially flexible but may be stabilized with a rigid frame. One or more of the slats may be interconnected to form the tonneau cover. Thus, the slats may be moved, pivoted, or both independent or simultaneously. The slats may also extend transverse to a length of the cargo box. As such, a plurality of slats may be interconnected to cover the cargo box.

One or more of the slats may include a channel. The channel may function to increase structural integrity of the slats. The channel may function to receive a component of the tonneau cover, such as a disconnect or other type of interlocking component. The channel may include an opening to receive the one or more components or may be substantially enclosed. The channel may form a U-shape, a V-shape, a C-shape, a D-shape, or a combination thereof. The channel may include one or more flanges projecting inwardly toward each other or away from the channel. The flanges may include a lip or may be substantially planar. The flanges along with one or more portions of the channel may guide a component along the channel in a substantially linear direction along a longitudinal axis of the channel. That is, the flanges and the channel may act as a track to guide the one or more components.

To further guide one or more components, the channel of the slats may include one or more notches. The notches may function as a stopping point to stop or otherwise secure the one or more components. The notches may receive a portion of the one or more components, such as a disconnect as described herein, to maintain a position of the component. As such, the component may be released from the notches prior to any further movement along the channel. The notches may be a single notch or a plurality of notches. The notches may be formed in pairs, such as along opposing flanges of the channel, opposing faces or sidewalls of the channel, or both. That is the pair of notches may extend transversely to each other relative to the longitudinal axis of the channel. Additionally, it is envisioned that the notches may be any desired size and/or shape to receive a portion of the one or more components located within the channel.

Some of the panels may be slats while others may be a panel of a different structure. For example, a plurality of interconnected slats may form a portion of the tonneau cover. Additionally, a front and/or rear panel may be located at opposing ends of the interconnected slats. The front and/or rear panel may be configured for pivoting, rotation about a hinge-point, or both while the interconnected slats may be substantially free of pivoting and/or rotation, and the slats may be configured for guidance along side rails of the cargo box. Similarly, the tonneau cover may include a front panel located proximately to a cab of the vehicle while a tail slat may be positioned proximately to the tailgate of the vehicle. Thus, it may be gleaned from the present teachings that the tonneau cover may provide various functionality within the slats or other panels of the tonneau cover.

The open position of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The closed or retracted position of the tonneau cover may be when the tonneau cover, or at least one enclosure panel of the tonneau cover, is in contact with, engages, or rests on the tailgate, a top edge or top surface of the tailgate, a top edge or top surface of the one or more walls of the cargo box, or a combination thereof, but applies less force or pressure thereon compared to when the tonneau cover is in the closed or lowered position. Therefore, the tonneau cover may also provide one or more positions where the tonneau cover may be partially open or raised partially closed or lowered, or a combination thereof. For example, a partially opened or partially closed position may be defined as one or more enclosure panels spaced apart from the walls or side rails of the cargo bed while a plurality of interconnected slats remains in contact with the side rails to cover a portion of the cargo box.

The tonneau cover may be electronically actuated between the open position and the close position, or one or more positions therebetween. Electronic actuation of the tonneau cover may be triggered by one or more interactions from the user. These interactions may include, but are not limited to: one or more commands entered into a wireless application (e.g., an application on a mobile device, tablet, computer, etc.); one or more buttons or commands entered on a wireless fob (e.g., a key fob); a user nearing the vehicle within a proximity range that senses the users presence and sends a signal for electronic actuation of the tonneau cover; one or more sensors or buttons along the vehicle physically touched by the user; one or more voice commands; one or more physical motions of the user recognized by one or more sensors and/or cameras along the vehicle; or a combination thereof.

Actuation of the tonneau cover may be completed by one or more motors. The one or more motors may be positioned anywhere along the tonneau cover. The one or more motors may be located within the confines of the cargo box, the vehicle cab, or somewhere therebetween. It is envisioned that the teachings herein may be advantageously integrated into any automated tonneau cover whereby any type of automated drive system is utilized. For example, the drive system may be a drum drive system, a helical cable drive system, or both. The motor may be a brushless motor, an AC or DC motor, a geared and/or stepped motor, or a combination thereof. Examples of drive systems for tonneau covers can be found in U.S. patent application Ser. No. 17/496,290, filed on Oct. 7, 2021, all of which is incorporated herein for all purposes.

The tonneau cover may be electronically actuated to retract from the closed position (i.e., a position where the tonneau cover is in contact with the cargo box to enclose the cargo box) to the open position (i.e., a position where the tonneau cover is free of enclosing the cargo box). In the open position, all or a portion of the tonneau cover may be contained within a canister.

The canister may function to house one or more panels, one or more slats, or both of the tonneau cover. The canister may house the panels and/or slats in a fully open position of the tonneau cover, in a semi-open position of the tonneau cover or both. The fully open position may be considered retraction of the tonneau cover (e.g., slats of the tonneau cover) into the canister. Thus, when in such a retracted or open position, the slats may be contained in the canister and free from view. To house the slats and/or panels of the tonneau cover, the canister may include a canister body. The canister body may be enclosed by one or more side panels. However, it should be noted that while a visible canister may be mounted within the cargo box (e.g., near a front of the cargo box closes to a cab of the vehicle), the tonneau cover may also be housed within a bulkhead or false bulkhead located within the cargo box of the vehicle. As such, the canister or a storage compartment of the tonneau cover may include a front panel to facilitate opening and/or closing of the canister or storage compartment.

The front panel may extend across the opposing side walls or side rails of the cargo box. The front panel may be located nearest a cab of the vehicle where the tonneau cover is housed when in an open or retracted position. The front panel may function to pivot between an open position and a closed position. The open position may be defined as a position where the front panel is disconnected from, or space apart from, the side rails, canister opening, bulkhead opening, or a combination thereof. The closed position may be defined as a position where the front panel is in contact with, or engages, the side rails, canister opening, bulkhead opening, or a combination thereof to enclose the canister and/or bulkhead. Thus, it may be gleaned from the present teachings that the front panel may be actuated by one or more actuator assemblies or striker assemblies, such as those found in U.S. patent application Ser. No. 16/953,839, filed on Nov. 20, 2020, all of which is incorporated herein in its entirety for all purposes.

As discussed above, the tonneau cover may be driven by a drive system having one or more motors. To facilitate movement of the tonneau cover by the one or more motors, one or more cables may be connected to the tonneau cover (e.g., one or more slats) and maintain communication with the one or more motors. The cable may include one or more engaging portions to communicate with the motor. For example, the cable may be a helical cable that facilitates teeth of a motor gear meshing with the cable to advance the cable along the motor gear, thereby moving the tonneau cover. However, it is envisioned that the cable may be any gauge or configuration that may connect to the tonneau cover to move the tonneau cover. For example, the cable may be free of a coil surrounding a core and may instead include one or more divots, channels, barbs, notches, projections, or a combination thereof that engage the teeth of the drive gear and move the tonneau cover. Additionally, the type of cable may also be selected based upon the drive system configuration being utilized (e.g., a gear drive system versus a drum drive system).

It is also envisioned that the cable may be at least partial secured within a casing. The casing may function to protect the cable from debris or moisture that may degrade the cable, thereby impacting performance of the drive system. The casing may partially or fully encapsulate an outer circumference of the casing. The casing may extend along an entire length or a portion of the length of the cable. For example, the casing may enclose the cable except for localized, exposed regions of the cable. Such exposed regions may allow for engagement of the cable with the motor (i.e., a drum and/or drive gear of the motor), allow for connection to one or more slats and/or panels of the tonneau cover, facilitate routing through one or more tight packaging constraints (e.g., a hole having a smaller diameter than a diameter of the casing), or a combination thereof. Therefore, it is envisioned that routing of the casing and/or cable may be particular to a desired configuration for a vehicle. Thus, the casing may be selected based upon varying packaging constraints.

The drive system may move one or more slats along side rails to open and close the tonneau cover. The side rails may function to guide the tonneau cover between the open position and the closed position. The side rails may abut one or more surfaces of the cargo box so that the tonneau cover may be secured to the cargo box. The side rails may include one or more projections, one or more protrusions, or both that mate to a surface of the cargo box. For example, the side rails may include a mounting portion that is positioned substantially parallel to a vertical sidewall of a cargo box so that, when installed, the side rail abuts the sidewall in a substantially flush manner (i.e., the abutment is substantially free of gaps between the mounting portion and the vertical lip). The side rails may abut the sidewall in a manner other than substantially flush. For example, a gap may exist between the side rail and the sidewall, yet the tonneau cover system may still properly function. The side rail may be a unitary piece or may comprise a plurality of components. For example, the side rail may be a single injection-molded piece having a plurality of integrated projections. Alternatively, the side rail may include a body having one or more projections fastened or adhered to a surface of the body.

The side rails may also include an opening. The opening may function to receive an end portion of the slats and/or panels of the tonneau cover. The opening may be formed between an overhang portion of the side rail—that is, a portion of the side rail that overhands an upper surface of the slats and/or panels—and a lower lip. The slats and/or panels may extend into the opening between the lip and the overhand portion to facilitate guidance of the tonneau cover along the side rails. As a result, the overhand portion and/or the lip may extend towards opposing surfaces of the slats and/or panels to prevent moisture and/or debris from entering the opening. As discussed further below, one or more seals along the overhand portion, the lip, or both, may compressibly engage the slats and/or panels to further prevent moisture and/or debris from entering the opening.

The opening may include a wear strip. The wear strip may function to contact the slats and/or panels and guide the slats and/or panels along the side rail. The wear strip may prevent degradation of the side rail due to friction between the tonneau cover and the side rails (i.e., dragging the slats along the side rail). The wear strip may be positioned to support the slats and/or panels or a portion thereof. For example, the wear strip may support an end cap of the slats.

The slat end cap may be secured to a terminal end of the slat. The end cap may function to engage the wear strip within the opening of the side rail. The end cap may function to at least partially close the channel of the slat, thereby at least partially containing a component within the channel. The end caps may slide along the wear strip to open and close the tonneau cover. The end caps may act as a riser to ensure the slats sit above the lip of the opening, thereby more freely allowing the slats to move along the side rails while still maintaining sufficient moisture and/or debris protection for the opening. The end caps may also include an opening or aperture to facilitate communication of a component within the channel and a portion of the side rails or the drive system, as further discussed below.

As discussed above, the drive system of the tonneau cover may utilize one or more cables connected to the tonneau cover (e.g., connected to slats and/or panels of the tonneau cover) to drive the tonneau cover between the open position and the closed position. To further improve packaging constraints of the tonneau cover, the cable may beneficially be routed through the side rails, thereby fully integrating the drive system within the tonneau cover. That is, the cable may be substantially or entirely hidden from the view of a vehicle user. For example, the side rails may be integrated with bed caps of the cargo box and thus the cables and drive system may also look to be visually integrated with the bed caps of the cargo box. As a result, the tonneau cover may visually look to be an OEM product and not an aftermarket component.

To create such integration, the side rails may include one or more channels to route the cables, wires, other items, or a combination thereof. The channels may be fully or partially enclosed to secure the cables. The channels may extend along a length of the side rails so that the cables may be routed into or through holes along the side rails to connect the cables between the tonneau cover and the drive systems through the side rails. As such, the cables may advantageously not encroach on an interior of the cargo box, thereby optimizing storage space within the cargo box.

To create such integration, the side rails may include one or more channels to route the cables, wires, other items, or a combination thereof. The channels may be fully or partially enclosed to secure the cables. The channels may extend along a length of the side rails so that the cables may be routed into or through holes along the side rails to connect the cables between the tonneau cover and the drive systems through the side rails. As such, the cables may advantageously not encroach on an interior of the cargo box, thereby optimizing storage space within the cargo box.

While there may be many benefits to an automated or motorized drive system for the tonneau cover, a user may be required in certain circumstances to manually release or otherwise move the tonneau cover to access and/or enclose the cargo box. For example, during a power outage (e.g., a dead battery within the vehicle) or a faulty motor, a user may be required to manually move the tonneau cover to access their cargo box. In such a case, a disconnect in communication with the drive system may be utilized to manually disconnect the tonneau cover or slats thereof from the drive system.

The disconnect may function to connect one or more slats of the tonneau cover with a drive system of the tonneau cover. Similarly, the disconnect may provide a user a mechanical release to disconnect the one or more slats of the tonneau cover from the drive system. The disconnect may be secured to one or more slats of the tonneau cover, such as a tail slat closest to the tailgate. The disconnect may be secured to the slat within the channel of the slat. For example, the disconnect may be at least partially contained within the channel. Advantageously, such packaging may conceal most or all of the disconnect from a line of sight when the tonneau cover is in a closed or partially closed position. However, the disconnect may still be easily accessible by a user if needed.

To optimize ease of disconnection, a single disconnect may be integrated into the tonneau cover. As a result, a user may beneficially disconnect a release mechanism to disconnect the slats or panels of the tonneau cover from engagement with the drive system. Thus, a user may then manually move the slats or panels along the side rails to open and/or close the tonneau cover. However, when needed, it should also be noted that a plurality of disconnects may utilized within a single tonneau cover. For example, a pair of disconnects may be located along the same or different slats near opposing side rails. That is a first disconnect may release the slats or panels of the tonneau cover from a first side rail while a second disconnect may release the slats or panels of the tonneau cover from a second side rail.

The disconnect may be fixedly secured to the slat. However, it is envisioned that the disconnect may be movable secured to the slat, such as movably guided along the channel of the slat. Such movement may facilitate connection and/or disconnection between the disconnect and the drive system. For example, a block of the disconnect may be guided along the channel or one or more flanges of the channel.

The block may function as a movable member of the disconnect. The block may function as a base of the disconnect. The block may function as a connection point to the drive system. The block may be received by the channel so that the block is guided along the channel. The block may be any desired size and/or shape to fit within the channel. However, it is envisioned that the block is an appropriate size to fit within the channel yet not release from the channel accidentally through an opening therein.

The block may include an extension. The extension may function to connect the disconnect—and thus the one or more slats—with the drive system. The extension may project away from the disconnect towards a side rail of the tonneau cover. Similarly, the extension may project towards a drive system located within the side rail. The extension may extend through an opening of an end cap of a slat to be at least partially received within an opening of the side rail or the extension may stay within the confines of the channel to receive a portion of the drive system. While the extension may be any shape, the extension may include a receiving portion that receives a portion of the drive system. That is, the receiving portion may be a female portion while the drive system includes a male portion that may be inserted or otherwise connected to the female portion. The male portion of the drive system may be located along the cable of the drive system. The male portion along the cable may be a cable extension.

The cable extension may function to connect the cable—and thus the drive system—to the disconnect or one or more additional parts of one or more slats. The cable extension may extend from the cable to communicate with the disconnect, such as the receiving portion of the extension of the block tab. The cable extension may extend away from the side rail towards a slat or an end cap thereof. As such, the cable extension may be unobstructed by the casing of the cable. For example, the cable extension may be a localized portion of the cable that is free of casing or the cable extension may extend through a cutout along the case to communicate with the disconnect. The cable extension may be secured to the cable or may be integrally formed (i.e., monolithically formed) with the cable. It should also be noted that while the cable extension described below is a male portion being received by the receiving portion of the block extension, the cable may also include a female portion. For example, the extension of the block may extend as a male portion that is received by a female portion of the cable.

Communication between the cable extension and the block tab (e.g., an extension thereof) may maintain connection between the slats and the drive system. To facilitate disconnection, the block may be moved along the channel of a slat to release the cable extension from the receiving portion of the block extension. To create such movement, the block may include one or more bulbs.

The bulbs may function to contact the channel and guide the block along the channel. The bulbs may be a contour or other projection extending from the block. The bulbs may be positioned near one or more corners of the block to contact the channel. Each bulb may contact one or a plurality of sidewalls of the channel. The bulbs may be any contour, bump-out, undulation, projection, rounded portion, arcuate portion, or a combination thereof. The bulbs may extend along an entire length of the block or only partially along the length. For example, the extension of the block may be free of any bulbs.

The block may also include a cavity to house one or more additional components of the disconnect. The cavity to may function to house one or more movable members of the disconnect. The cavity may be any hollowed portion of the block. The cavity may include one or more openings, one or more cutouts, one or more apertures, or a combination thereof.

A lever may be at least partially contained within the cavity of the block. The lever may function to release the disconnect from engagement to the slat or a channel thereof. The lever may function release the disconnect from connection to the drive system. The lever may be pivotally or movably engaged to the block of the disconnect. For example, a pin of the disconnect may pivotally or movably connect the lever to the block, such as by one or more barrels of the lever at least partially secured around the pin. As such, it is envisioned that the block or the cavity of the block may include one or more openings or sufficient clearance to receive all or a portion of the lever.

During a release operation of the lever, a tab of the lever may be grasped or pushed by a user. The lever may be pushed away from the channel to disconnect the lever from the channel. For example, as further discussed below, the one or more projections of the lever tab may engage notches along the channel. However, the tab may connect or engage the channel in any desired fashion that may facilitate disconnection between the lever and the channel. As such, the lever may be pushed upward into or towards the block of the disconnect. Therefore, the block may include one or more openings to receive at least a portion of the lever tab. Once the lever tab has been released from the channel, the disconnect may be moved to one or more designated locations along the channel (e.g., one or more additional locations along the channel having a notch), or one or more locations therebetween.

To move the disconnect along the channel, a user may grasp either the tab of the lever, a tab of the block, or both. While a portion or most of the disconnect may be contained within a channel of the slat, the lever tab and/or the block tab may project outward through an opening of the channel to provide a user a contact point to release the disconnect from the channel and also move the disconnect along the channel. However, the lever tab and/or the block tab may also be contained within the channel to provide flush packaging.

The lever tab may include one or more projections. The projections may function to engage the channel of the slat. The projections may be received by notches along the channel to establish a determined stopping and/or locking point for the disconnect. The projections may be located anywhere along the tab that facilitates releasable connection to the channel. However, the tab may also be free of projections in certain applications.

To ensure proper connection between the disconnect and the channel, the disconnect may include a biasing member. The biasing member may function the lever away from the block and/or towards the channel. For example, the biasing member may bias the lever towards notches of the channel to ensure automatic engagement of the projections within the notches when in an appropriate location along the channel. The biasing member may contain a helical portion the is positioned around a pin of the disconnect. The biasing member may also include one or more arms or fingers the abut a surface of the block and/or lever to create a biasing force. The biasing member may be a spring, coil, elastic member, or a combination thereof.

Turning now to the figures, FIG. 1 illustrates a cargo box 12 of a vehicle 10. The cargo box 12 includes a tonneau cover 16 disposed along an upper surface or edge of the cargo box 12. The tonneau cover 16 may span between opposing bed caps 24 and may be supported by side rails (not shown) connected to, or integrally formed with, the bed caps 24. As shown, the tonneau cover 16 is in a closed or extended position, whereby the cover 16 includes a plurality of interconnected slats 32 spanning between a tail slat 34 and a front panel 42 to cover an interior of the cargo box 12. Therefore, the tonneau cover 16 along with a tailgate 14 of the cargo box 12 and outer fenders 22 of the cargo box 12 may at least partially or fully enclose the interior of the cargo box 12.

Figure 2:
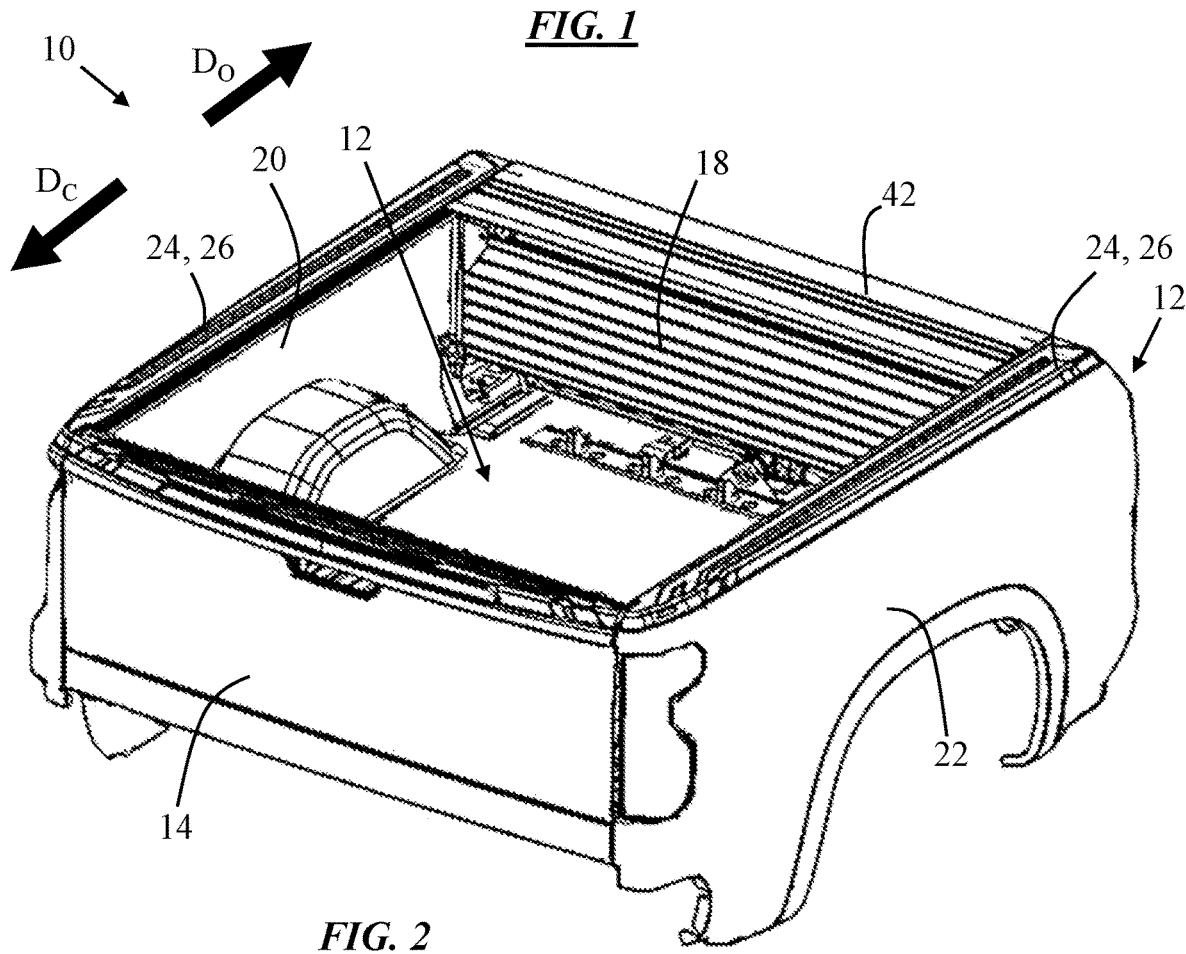
FIG. 2 is a perspective view of the cargo box of FIG. 1 with the tonneau cover in an open position.

FIG. 2 illustrates the tonneau cover 16 of the cargo box 12 in FIG. 1. As shown, the tonneau cover 16 is in an open or retracted position, whereby all or a portion of the interior of the cargo box 12 is exposed or otherwise accessible. That is, a user may access the interior of the cargo box 12 via the tailgate or along the top edge of the cargo box 12. The tonneau cover 16 may be guided along the side rails 26 recessed from, flush with, or protruding from an upper surface of the bed caps 24. It is envisioned that the tonneau cover 16 may be guided along the side rails 26 by one or more motors (not shown) in communication with the slats of the tonneau cover 16. The one or more motors may drive the tonneau cover 16 in a direction of closing ($D_C$) to extend the tonneau cover 16 over all or a portion of the cargo box 12. Similarly, the one or more motors may also drive the tonneau cover 16 in a direction of opening ($D_O$) to retract the tonneau cover 16, thereby exposing all or a portion of the interior of the cargo box 12. During retraction, one or more (e.g., two or more, three or more, all, etc.) slats may be retracted into a canister 18 to house the slats when in an open or partially open position. As shown, the canister 18 may beneficially be positioned at least partially beneath the front panel 42 and extend between opposing inside panels 20 of the cargo box 12.

Figure 3:
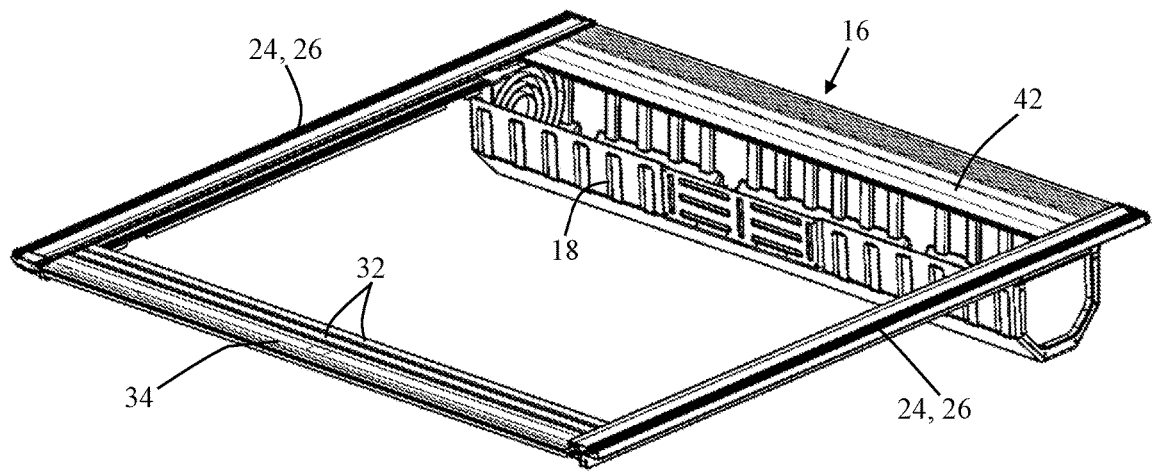
FIG. 3 is a perspective view of a tonneau cover.

FIG. 3 illustrates a perspective view of a tonneau cover 16. The vehicle and cargo box as shown in FIGS. 1 and 2 has been omitted for simplicity and clarity. A plurality of slats 42 extend between opposing side rails 24. The opposing side rails 24 are adapted to mount to one or more side walls, top edges, panels, fenders, or a combination thereof of the cargo box of the vehicle. Similarly, the opposing side rails 24 may be integrated with, or otherwise connected to, the bed caps 26 of the cargo box. As discussed above, one or more slats 42 of the tonneau cover 16 may be housed within the canister 18 when retracted. The front panel 42 may be positioned adjacent to or above the canister 18 to form an opening with the canister 18 to receive the one or more slats 42 within the canister 18. It should be noted that only a portion of slats 32 have been shown in FIG. 3 to further simplify the structure.

Additionally, a tail slat 34 may be interconnected with one or more additional slats 32 of the tonneau cover 16. The tail slat 34 may be positioned rearmost in the cargo box of the vehicle. As a result, the tail slat 34 may be positioned closest to the tailgate when the tailgate is in an upright position. The tail slat 34 may extend and/or retract with the other slats 32 during articulation. However, in some instances, the tail slat 34 may remain stationary during moving of the other slats 32.

Figure 4:
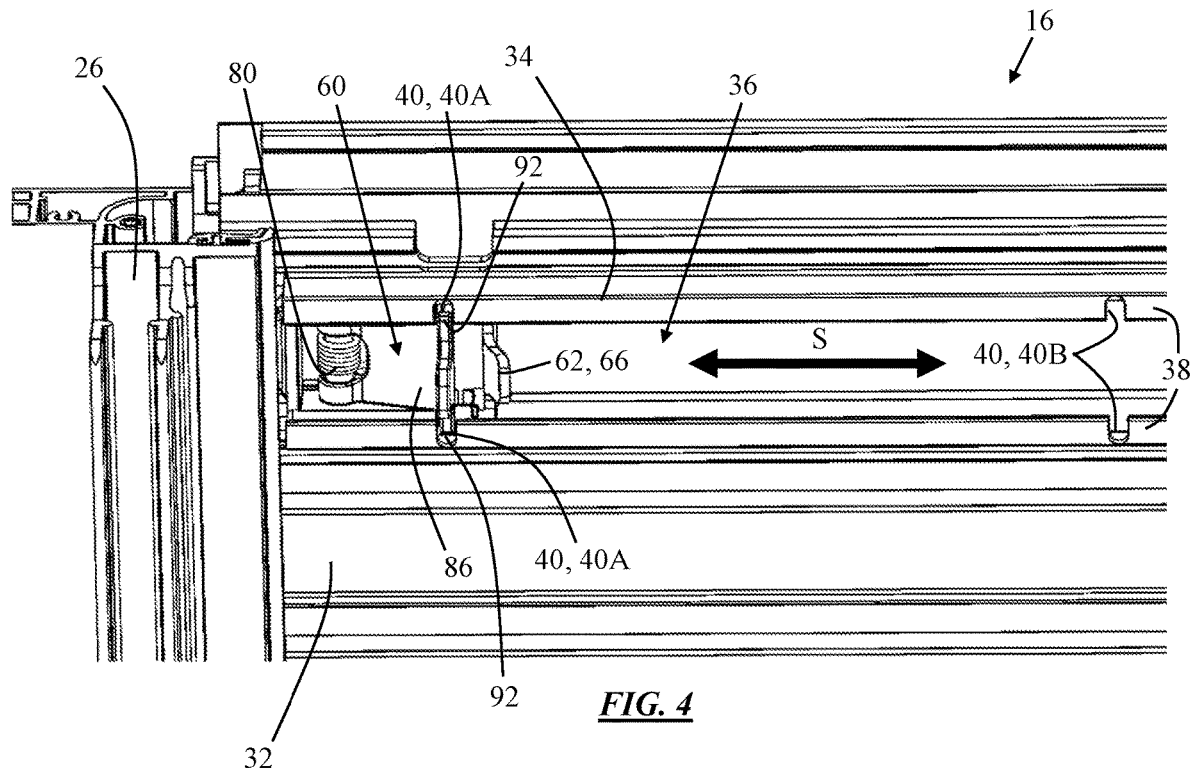
FIG. 4 is a bottom view of a disconnect of a tonneau cover.

FIG. 4 illustrates a bottom view of a partial tonneau cover 16. As discussed above, a plurality of slats 32, including a tail slat 34, may extend between opposing side rails 26 secured to the cargo box of a vehicle. One or more of the slats 32, such as the tail slat 34, may include a channel 36 therein configured to receive a disconnect 60 of the tonneau cover 16. The disconnect 60 may be supported by opposing flanges 38 of the tail slat 34 so that the disconnect 60 is positioned substantially within the channel 36. While it is envisioned that the tonneau cover 16 may be operated by one or more motors, a user may still need to manually open the tonneau cover 16 due to a lack of power being received by the one or more motors, a defect in the one or more motors causing the tonneau cover 16 not to articulate correctly, or both. Thus, the disconnect 60 may provide the user access to manually disconnect the tonneau cover 16 (e.g., the one or more slats 32, 34) from the side rails 26 or a drive system disposed therein.

The disconnect 50 may include a block 62 positioned with the channel 36 of the tail slat 34. A lever 86 may be movably connected to the block 62 by a biasing member 80 so that the lever 86 may be moved by a user to release the disconnect 50 from the side rail 26 or drive system therein.

The tail slat 34 may include a plurality of notches 40. In a connected position, the disconnect 60 may be secured within a first pair of notches 40A so that one or more projections 92 extending from a tab of the lever 86 are positioned within the first pair of notches 40A. The projections 92 may be secured in the first pair of notches 40A due to the biasing member 80 biasing the lever 86 towards the flanges 38 of the tail slat 34 and thus towards the first pair of notches 40A. As discussed in further detail below, the disconnect may include a portion in communication with the drive system of the tonneau cover 16 or the side rail 26, thereby mechanically interlocking the disconnect—and by extension the slats 32, 34—with the drive system and/or the side rail 26.

To disconnect the slats 32, 34 from the drive system and/or the side rail 26, a user may apply a force on the lever 86 to press the lever 86 towards the block 62. That is, the lever 86 may be pushed upward into the channel 36 of the slat 34 to disengage the projections 92 of the lever 86 from the first pair of notches 40A. Once the projections 92 are disengaged from the first pair of notches 40A, the disconnect 60 (i.e., the block 62) may slide in a direction(S) away from the side rail 26. A user may slide the disconnect 60 using a tab 66 of the block 62, a tab of the lever 86, or both.

To secure the disconnect 60 in a position no longer in communication with the side rail and/or the drive system therein (i.e., in a release position), the disconnect 60 may be guided within the channel 36 of the slat 34 until the projections 92 of the lever 86 are secured within a second pair of notches 40B inwardly positioned relative to the first pair of notches 40A. Similarly, to reengage the slats 32, 34 with the side rail 26 and/or a drive system therein, the projections 92 may be released from the second pair of notches 40B and the disconnect 60 (i.e., the block 62) may be moved in an opposing sliding direction(S) until the projections 92 are once again positioned in the first pair of notches 40A.

Figure 5:
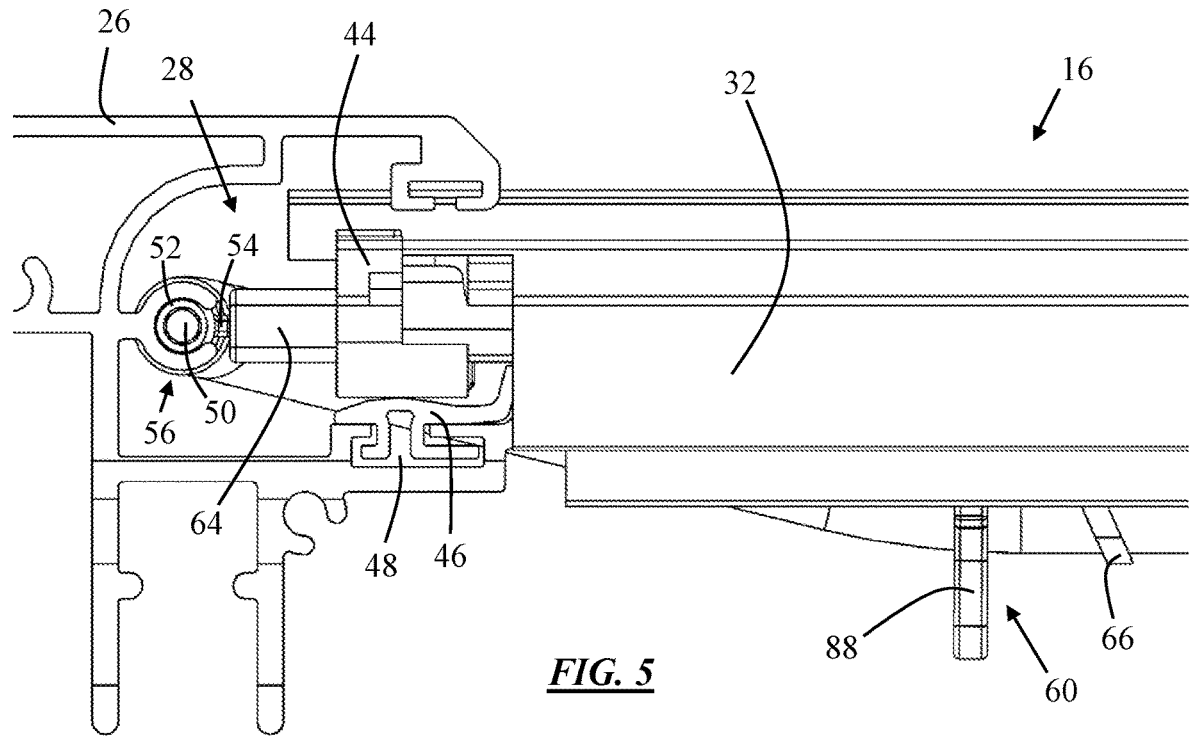
FIG. 5 is a sectional view of a tonneau cover having a disconnect in a secured position.

FIG. 5 illustrates a sectional view of a tonneau cover 16 having a disconnect 50 as described herein. As shown, the disconnect 50 is in a secured positioned, whereby an extension 64 of the disconnect 60 is in communication with an extension 54 of a cable 50 of the tonneau cover 16 drive system. As discussed above, the disconnect 50 may be positioned within a channel of a slat 32. It should be noted that while the disconnect 50 has been described as being in communication with a tail slat (FIG. 4), the disconnect 50 may be located within any slat 32 of the tonneau cover 16. Similarly, a plurality of disconnects 50 (e.g., one or more, two or more, three or more, etc.) may be located within one or more slats 32 of the tonneau cover 16.

When in the secured positioned, the extension 64 of the disconnect 60 may extend through an end cap 44 of the slat 32 to communicate (e.g., connect) to the extension 54 of the cable 50. As shown, the cable 50 may be at least partially housed within a casing 52 and secured within a cable channel 56 positioned in an opening 28 of a side rail 48. It is envisioned that the cable 50 may be in communication with one or more motors to drive the tonneau cover 16 between an open position and a closed position, or one or more positioned therebetween. Thus, by engaging the extension 54 of the cable 50 with the extension 64 of the disconnect 60, the slats 32 of the tonneau cover 16 may remain engaged with the drive system. In the engaged position, the slats 32 or end caps 44 connected to the slats 32 may be guided along a wear strip 46 secured in a slot 48 of the side rail 28 to move between an open and a closed position.

Beneficially, a tab 88 of the lever of the disconnect 60, a block tab 66 of the disconnect 60, or both, may protrude from the channel of the slot 32. As a result, a user may easily access the tab 88 of the lever, the block tab 66, or both to release the disconnect (see FIG. 6).

Figure 6:
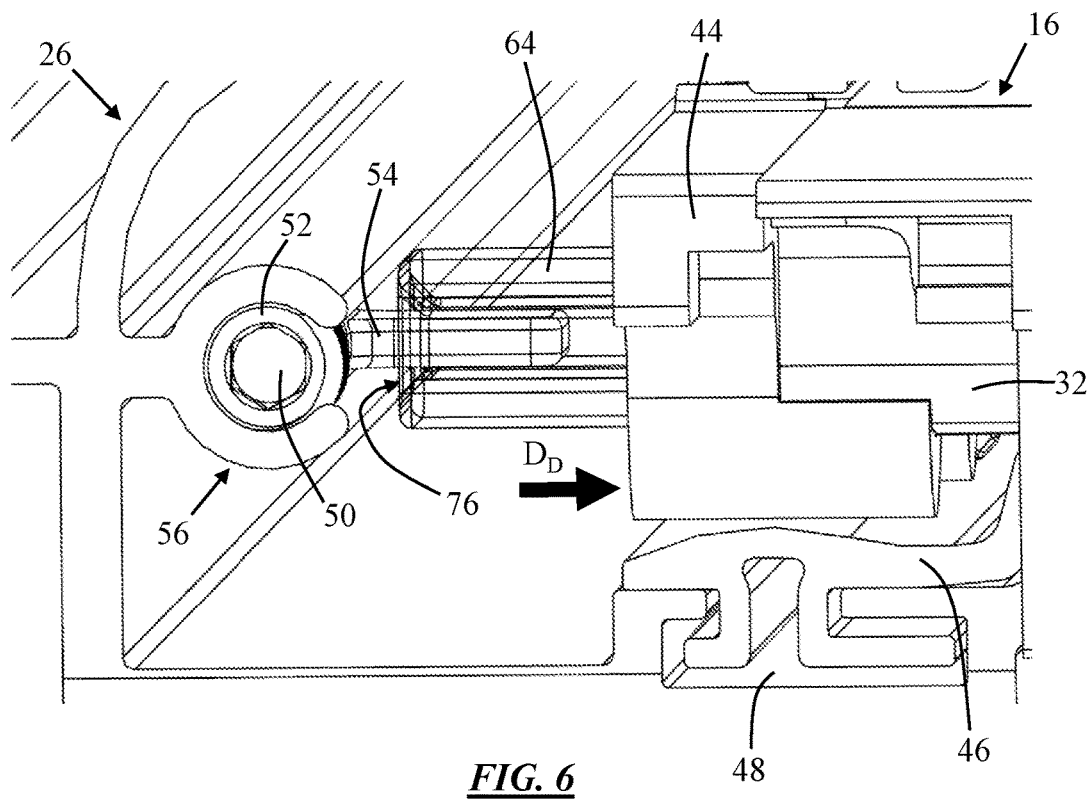
FIG. 6 is a close-up view of FIG. 5.
Figure 7:
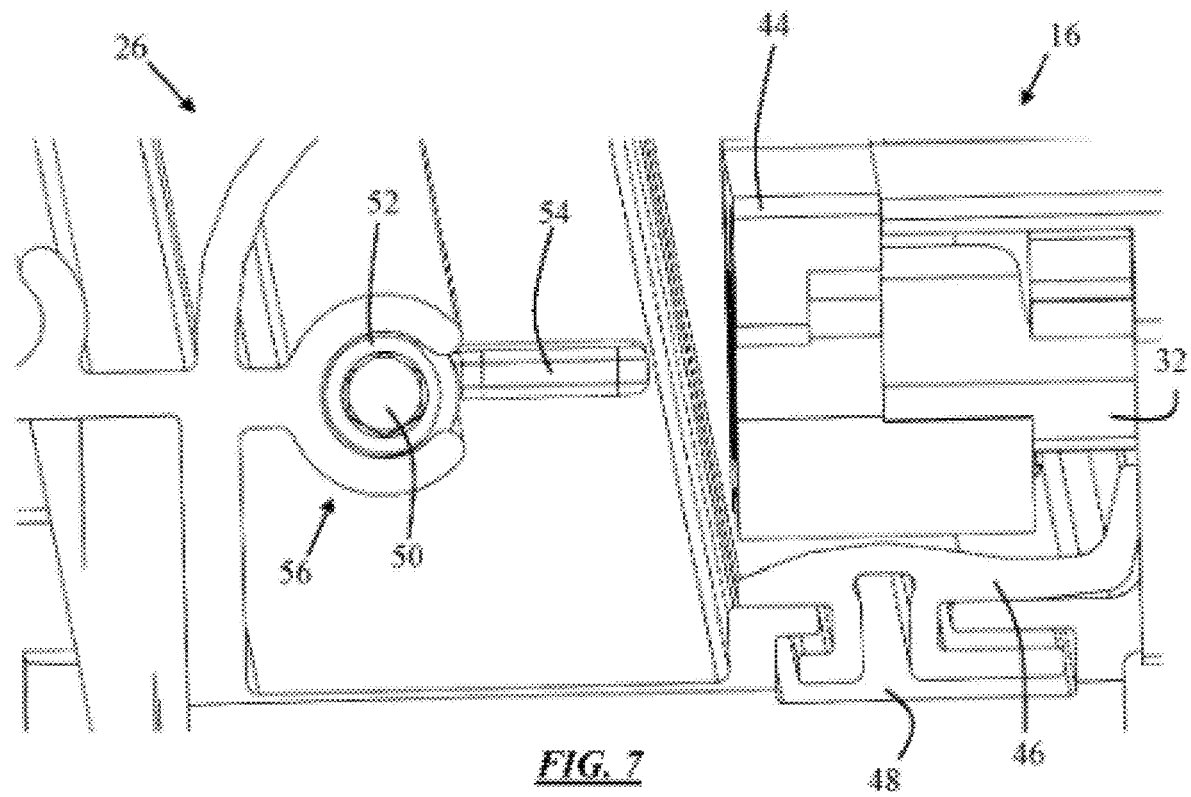
FIG. 7 is a sectional view of a tonneau cover having a disconnect in a released position.

FIGS. 6 and 7 illustrate a close-up view of the disconnect shown in FIG. 5. FIG. 6 illustrates the disconnect in a secured position while FIG. 7 illustrates the disconnect in a released position. As discussed above and shown in FIG. 6, the disconnect may be positioned within a channel of a slat 32 such that an extension 64 of the disconnect extends through an end cap 44 secure to the slat 32. The extension 64 may extend inwardly into the opening of the side rail 48 so that an extension 54 of the cable 50 extends into a receiving portion of the extension 64 of the disconnect (see FIG. 8). As a result, when the extension 64 of the disconnect and the extension 54 of the cable are in communication, movement of the cable 50 along the cable channel 56 of the side rail 26 results in movement of the slats 32 of the tonneau cover 16. During such movement, a drive system (e.g., a motor) may move the cable 50, and thus move the slats 32 along a wear strip 46 positioned beneath a bottom surface of the end caps 44 and secured within a slot 48 of the side rail 26.

As detailed herein, the disconnect may be released to disengage the extension 64 of the disconnect from the extension 54 of the cable 50. To do so, the disconnect may be released from the channel of the slat 32 and moved in a disconnection direction ($D_D$). As shown in FIG. 7, once the disconnect has been moved in the disconnection direction ($D_D$), the extension 54 of the cable 50 is free of contact with the disconnect, thereby releasing the slat 32 and end cap 44 from communication with the cable 50. As a result, a user may advantageously manually operate the tonneau cover 16 to move the one or more slats 32 free from the drive system and cable 50 thereof.

Additionally, it can be seen from FIG. 7 that the extension 54 of the cable 50 may extend through an opening of the cable channel 56, an opening or cutout along a casing 52 of the cable 50, or both. As a result, the extension 54 of the cable 50 may extend inwardly toward the end cap 44, thereby contacting or otherwise being in communication with the extension 64 of the disconnect.

Figure 8:
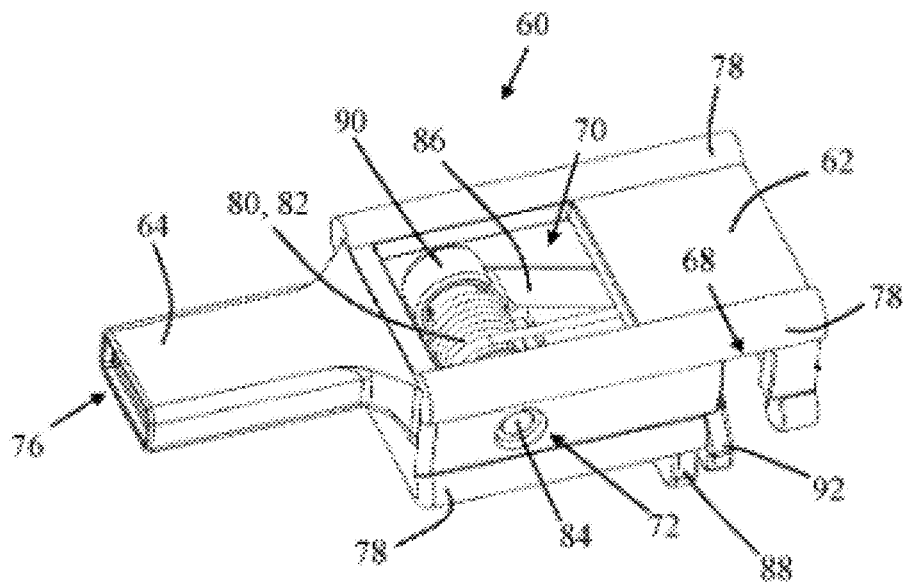
FIG. 8 is a perspective view of a disconnect in accordance with our present teachings.

FIG. 8 illustrates a perspective view of a disconnect 60 in accordance with the present teachings. The disconnect 60 includes a block 62 forming a body of the disconnect. The block 62 may be configured to be positioned within a channel of a slat of the tonneau cover (see FIG. 4). Once positioned within the channel of the slat, a plurality of bulbs 78 may be positioned to extend along a surface of one or more flanges of the channel, one or more inner surfaces of the channel, or both. As a result, the bulbs 78 may help guide the disconnect 60 along the channel during operation of the disconnect.

The block 62 may further include an extension 64 adapted to extend towards an opening within a side rail of the tonneau cover. The extension 64 may include a receiving portion 76 that receives a portion (e.g., an extension) of a cable located within the opening of the side rail, thereby engaging the disconnect 60 to the cable. As a result, the slats of the tonneau cover may be in communication with the cable to be driven by a drive system of the tonneau cover.

In certain instances, a user may be required to manually move the slats of the tonneau cover to open the tonneau cover, close the tonneau cover, or both. For example, if a vehicle battery powering the motor of the tonneau cover drive system is drained, a user may be required to manually operate the tonneau cover to access the cargo box. In such circumstances, the disconnect 60 must be released from the cable to manually move the slats of the tonneau cover.

To release the disconnect 60, a lever 86 positioned within a cavity of the block 62, as seen through the cutout 70 of the block 62, may be articulated upward until projections 92 along a tab 88 of the lever 86 are received into openings 68 of the block 62. As a result, the projections 92 and thus the lever 86 may no longer be engaged to the channel of the slat.

Once the lever 86 have been articulated, a user may slide the block 62 along the channel of the slat via the tab 88 of the lever 86, a tab 66 of the block 62, or both. In doing so, the user may disconnect the extension 64 from the cable, thereby releasing the slats of the tonneau cover from the drive system.

Additionally, the disconnect may be moved to one or more designated positions along the channel (see FIG. 4) in which the projections 92 of the tab 88 engage the channel. Upon releasing the lever 86, a user may move the disconnect 60 to a desired position, whereby the lever 86 may automatically be biased towards the channel due to a biasing member 80 connected between the block 62 and the lever 88. The biasing member 80 may include a helical portion 82 extending around a pin 84. The pin 84 may extend between apertures 72 of the block 62 and barrels 90 of the lever 88 so that the lever 88 is biased away from—or outwardly from—the cavity of the block 62. As a result, the projections may be biased away from the block 62 once the projections 92 reach the designated location along the channel of the slat (i.e., once the projections 92 reach notches along the channel of the slat).

Figure 9:
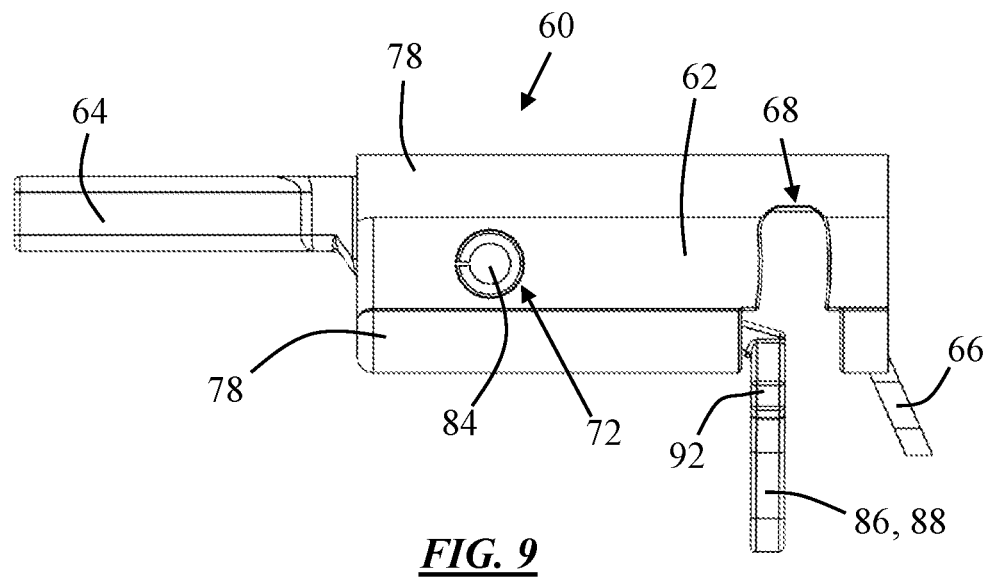
FIG. 9 is a side view of a disconnect in accordance with our present teachings.

FIG. 9 illustrates a side view of the disconnect 60 shown in FIG. 8. The disconnect 60 includes a block 62 having one or more bulbs 78 extending along a length of the block 62 near an upper and lower surface of the block 62. As such, the bulbs 78 may engage or otherwise contact a channel of the slat. As discussed above, a lever 86 may be biased relative to the block 62 by a biasing member positioned within a cavity of the block 62 and secured to a pin 84 extending between apertures 72 of the block 62. Due to the nature of the biasing member, a tab 88 of the lever 86 may be moved upwardly toward the block 62 until projections 92 along the tab 88 of the lever 86 are received within an opening 68 of the block 62. However, once the tab 88 of the lever 86 is released, the level 86 may be biased away from the block 62 to engage the channel of the slat. Thus, it may be gleaned from the present teachings that the disconnect 60 may be engaged and/or released from the channel of the slat due to articulation of the lever 86 relative to the block 62. Similarly, when the lever 86 is disengaged from the channel of the slat, the disconnect 60 may be moved via a tab 66 of the block 62 to release the extension 64 of the block 62 from the drive system of the tonneau cover.

Figure 10:
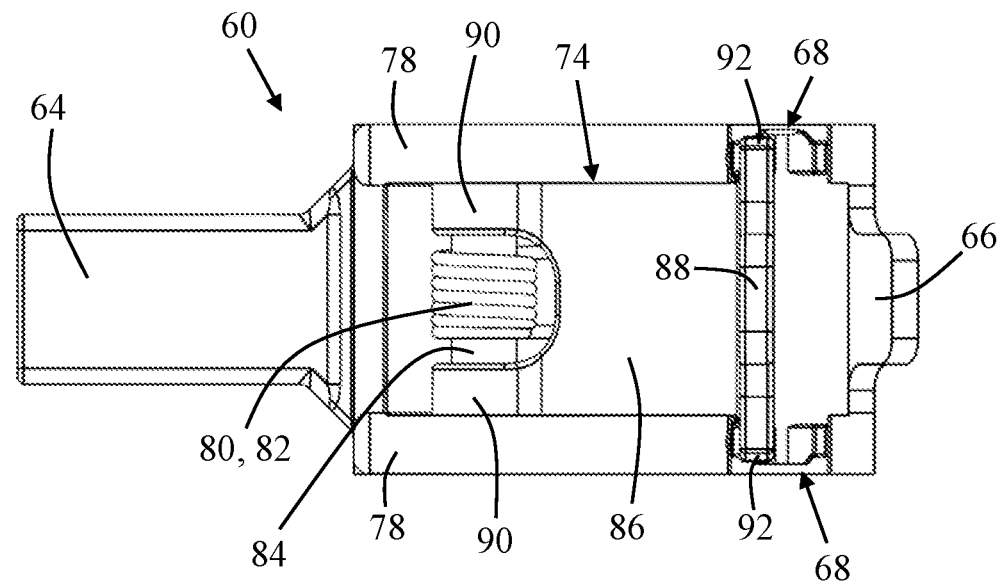
FIG. 10 is a bottom view of a disconnect in accordance with our present teachings.

FIG. 10 illustrates a bottom view of the disconnect 60 shown in FIGS. 8 and 9. As discussed above, the disconnect 60 includes a lever 86 positioned within a cavity 74 of a block 62. The lever 86 may be articulated relative to the block 62 due a to a biasing member 80 positioned therebetween. The biasing member 80 may include a helical portion 82 wrapped around a pin 84 to maintain a position of the biasing member 80. Similarly, barrels 90 of the lever 86 may receive the pin 84 to allow for pivoting of the lever 86 relative to the block 62.

Upon pivoting, a tab 88 of the lever 86 may extend upward into openings 68 of the block 62, thereby releasing projections 92 along the tab 88 from the channel of the slat. Once the projections 92 are released, the disconnect 60 may be guided along the channel of the slat by a plurality of bulbs 78 of the block 62 due to a user moving the disconnect 60 via a tab 66 of the block 62. As a result, an extension 64 of the block 62 may be disconnected from a drive system of the tonneau cover (e.g., a cable or extension thereof).

Figure 11:
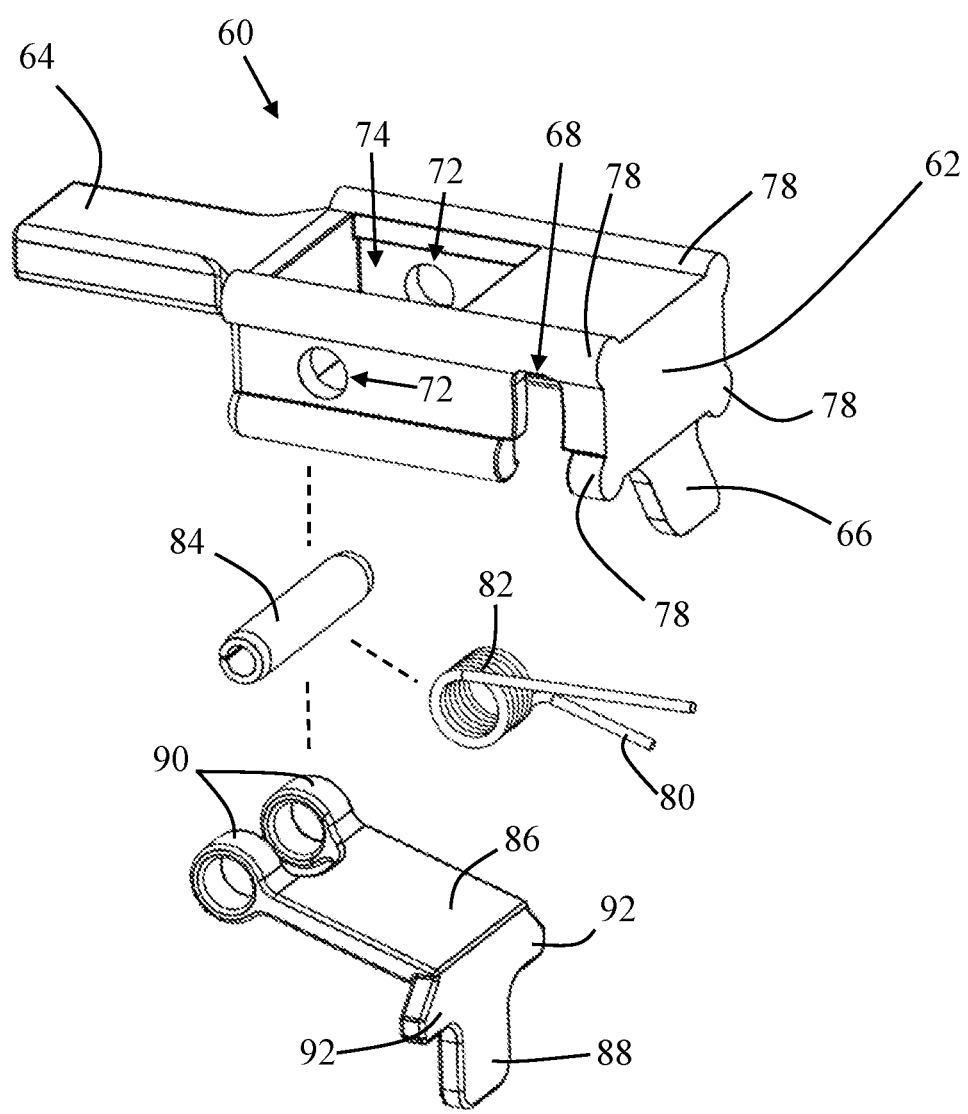
FIG. 11 is an exploded view of a disconnect in accordance with our present teachings.

FIG. 11 illustrates an exploded view of a disconnect 60 in accordance with the present teachings. The disconnect 60 may include a block 62. The block 62 may include a plurality of bulbs 78 positioned near corners of the block 62 and extending at least partially along a length of the block 62. The block may further include an extension 62 extending away from a cavity 74 of the block 62 and may be adapted to engage a drive system of the tonneau cover. Additionally, the block 62 may include a tab 66 positioned near a terminal end of the block 62 that opposed an end having the extension 62.

A pin 84 may be positioned within the cavity 74 of the block 62 so that the pin 84 extends between opposing apertures 72 located on side walls of the block 62. The apertures 72 may be substantially coaxial or aligned to receive the pin 84. A helical portion 82 of a biasing member 80 may be positioned around the pin 84 to locate the biasing member 80 within the cavity 74 of the block 62. Similarly, the pin 84 may extend through a plurality of barrels 90 located near an end of a lever 86 so that the lever 86 is at least partially positioned within the cavity 74 of the block 62. The biasing member 80 may also be at least partially positioned between the lever 86 and the cavity 74 of the block to bias a tab 88 of the lever 76 away from the block 62. As a result, a user may move the tab 88 upwards so that projections 92 of the tab 88 are received by openings 68 of the block 62 to decrease an overall height of the disconnect 60, to release the lever 86 from connection to a channel of a slat, or both. However, the biasing member 80 may thus beneficially bias the lever 86 away from block 62 once a user releases the tab 88 of the lever 86.

ELEMENT LIST

10 Vehicle
12 Cargo Box
14 Tailgate
16 Tonneau Cover
18 Canister
20 Inside Panel
22 Outer Fender
24 Bed Cap
26 Side Rail
28 Side Rail Opening
30 Floor
32 Slat
34 Tail Slat
36 Channel of the Slat
38 Flange of the Slat
40 Notch of the Slat
40A First Pair of Notches
40B Second Pair of Notches
42 Front Panel
44 End Cap
46 Wear Strip
48 Wear Strip Slot of the Side Rail
50 Cable
52 Casing
54 Cable Extension
56 Cable Channel
60 Disconnect
62 Block
64 Extension
66 Block Tab
68 Opening
70 Cutout
72 Aperture
74 Cavity
76 Receiving Portion
78 Bulb
80 Biasing Member 82 Helical Portion
84 Pin
86 Lever
88 Lever Tab
90 Barrel
92 Projection
$D_O$ Direction of Opening of the Tonneau Cover
$D_C$ Direction of Closing of the Tonneau Cover
$D_D$ Direction of Disconnection
S Sliding Direction The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference in their entirety for all purposes. Other combinations are also possible as will be gleaned from the following claims, which are also hereby incorporated by reference in their entirety into this written description.

What is claimed is:

1. A tonneau cover comprising:
   (a) a slat;
   (b) a drive system adapted to move the slat; and
   (c) a disconnect connected to the slat and in communication with the drive system,
   wherein the disconnect is adapted to release from communication with the drive system so that the slat manually moves independently from the drive system;
   wherein the disconnect is positioned within a channel of the slat, and the disconnect is adapted to slide along the channel of the slat;
   wherein the disconnect is supported by opposing flanges of the channel; and
   wherein the disconnect engages a first pair of notches along the opposing flanges of the channel when in communication with the drive system.

2. The tonneau cover of claim 1, wherein the slat extends between a first side rail and a second side rail, and the drive system is at least partially positioned within an opening of the first side rail.

3. The tonneau cover of claim 2, wherein the drive system includes a cable extending through the opening of the first side rail, and the disconnect is in communication with the cable.

4. The tonneau cover of claim 3, wherein an extension of the disconnect extends inwardly into the opening of the first side rail to receive an extension of the cable.

5. The tonneau cover of claim 4, wherein the drive system is driven by one or more motors to move the slat along the first side rail and the second side rail.

6. The tonneau cover of claim 4, wherein the extension of the disconnect extends through an end cap secured to a terminal end of the slat.

7. The tonneau cover of claim 6, wherein the tonneau cover includes a plurality of slats, and the disconnect is connected to a tail slat positioned closest to a tailgate of a cargo box of a vehicle when the tonneau cover is secured to the cargo box.

8. The tonneau cover of claim 1, wherein the disconnect engages a second pair of notches along the opposing flanges of the channel when released from communication with the drive system.

9. The tonneau cover of claim 1, wherein at least a portion of the disconnect is biased against the opposing flanges of the channel to engage the first pair of notches.

10. A tonneau cover comprising:
    (a) a slat extending between a first side rail and a second side rail;
    (b) a drive system adapted to move the slat, wherein the drive system is driven by one or more motors; and
    (c) a disconnect secured within a channel of the slat, comprising:
        (i) a block having a cavity therein, the block being supported by flanges of the channel;
        (ii) an extension extending away from the block inwardly towards an opening of the first side rail;
        (iii) a lever pivotally engaged to the block and at least partially positioned within the cavity of the block; and (iv) a biasing member in communication with the block and the lever to bias the lever away from the block;
wherein the extension of the disconnect is connected to the drive system so that the drive system drives the slat.

11. The tonneau cover of claim 10, wherein the drive system includes a cable extending through a channel positioned within the opening of the first side rail, and the extension of the disconnect engages the cable.

12. The tonneau cover of claim 11, wherein the extension of the disconnect includes a receiving portion that receives an extension of the cable when in an engaged position.

13. The tonneau cover of claim 10, wherein the disconnect is adapted to slide along the channel of the slat and disconnect from the drive system.

14. The tonneau cover of claim 10, wherein the lever includes a tab having a projection, and the projection of the tab engages a slot along the channel of the slat to maintain a position of the disconnect within the channel.

15. The tonneau cover of claim 14, wherein the lever is pivoted upward toward the block so that the projection is positioned within an opening of the block, thereby disconnecting the projection from the slot along the channel and allowing the block to move along the channel.

16. The tonneau cover of claim 15, wherein a pin secured within the cavity of the block extends through the biasing member and barrels of the lever to pivotally engage the lever and the block.

17. The tonneau cover of claim 16, wherein the pin is secured within opposing apertures of the block.

\* \* \* \* \*